Figure 2:
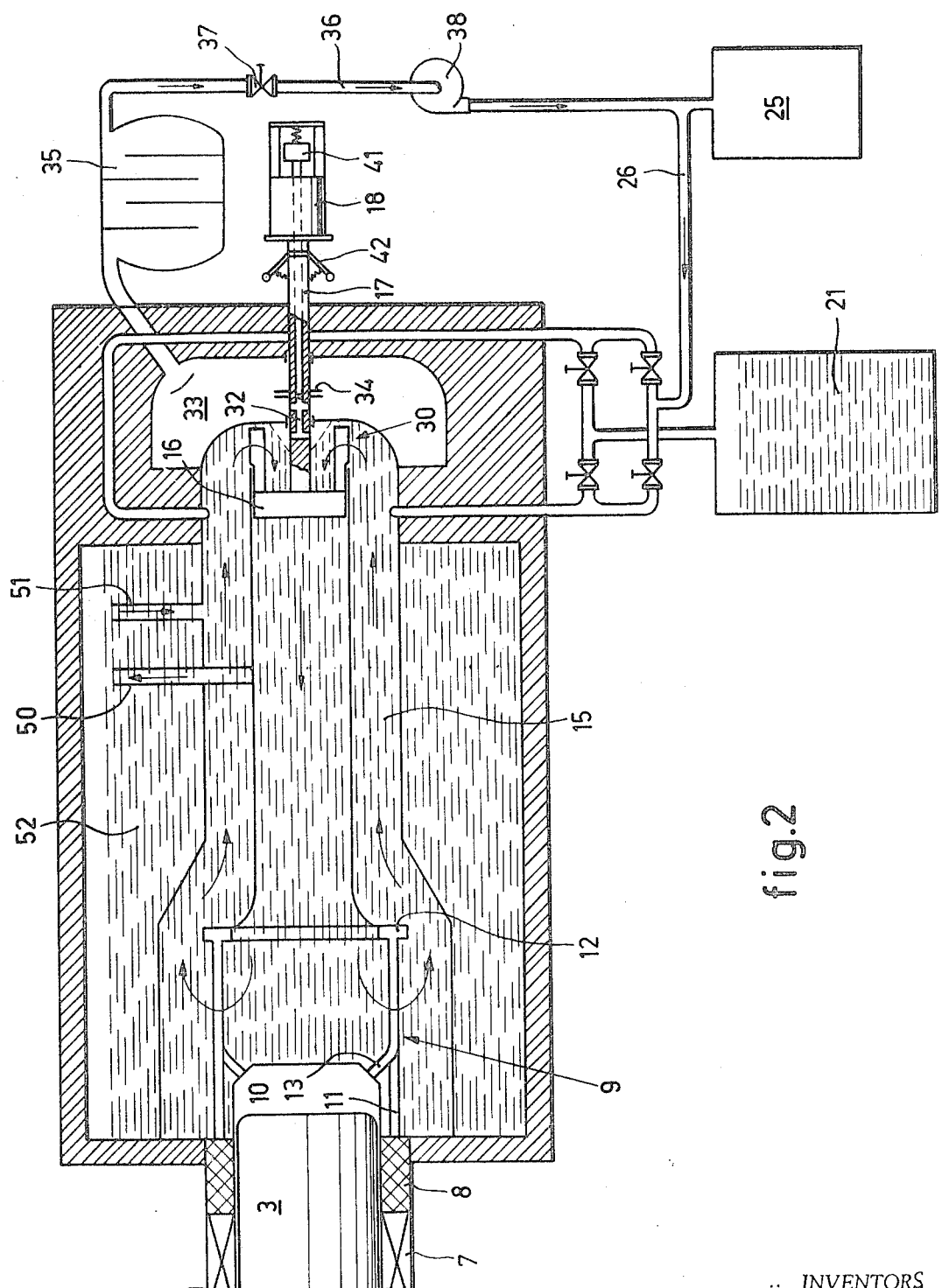

United States Patent
Schröder et al.

[15] 3,651,797
[45] Mar. 28, 1972

[54] HEATING SYSTEM

[72] Inventors: Johann Schröder, Aachen, Germany; Henricus Cornelis Johannes Van Beukering; Roland Anton Johan Otto Van Witteveen, both of Emmasingel, Eindhoven, Netherlands

[73] Assignee: U.S. Philips Corporation, New York, N.Y.

[22] Filed: Sept. 24, 1969

[21] Appl. No.: 860,585

[30] Foreign Application Priority Data

Sept. 30, 1968   Netherlands..........................6813989

[52] U.S. Cl.............................................126/263
[51] Int. Cl.............................................F24j 1/00
[58] Field of Search...........................126/263, 204; 165/46

[56] References Cited

UNITED STATES PATENTS

| | | | |
|---|---|---|---|
| 3,161,192 | 12/1964 | McCormack | 126/204 |
| 3,229,681 | 1/1966 | Gluckstein | 126/204 |
| 3,367,319 | 2/1968 | Carter, Jr. | 126/204 |
| 3,385,286 | 5/1968 | Jones | 126/204 |
| 3,450,127 | 6/1969 | Harwood, Jr. | 126/204 |

*Primary Examiner*—Charles J. Myhre
*Attorney*—Frank R. Trifari

[57] ABSTRACT

Heating system including a reaction vessel containing a liquid metal mixture and a reservoir containing an oxidizing agent, a supply duct including a control-cock for communicating the oxidizing agent to the vessel for an exothermic reaction with the metal, and an inert gas reservoir communicating through another duct into the supply duct. In the reaction vessel is a centrifuge, with an outlet for the inert gas in the vicinity of the rotary shaft of the centrifuge.

8 Claims, 2 Drawing Figures

HEATING SYSTEM

The invention relates to a heating system particularly for the supply of heat to a heat exchanger, which is traversed by a medium. The system comprises at least one reaction vessel containing a metal or metal mixture, which is liquid at the operational temperature, and at least one first container for an oxidizing agent capable of reacting chemically with the liquid in the reaction vessel while developing heat so that the reaction products are solid and/or liquid at the temperature and pressure prevailing in the reaction vessel. The container communicates through at least one duct including a control-cock with at least one supply duct connected with the reaction vessel, there being provided, in addition, at least one second container for a gaseous medium which does not react chemically with the liquid in the reaction vessel nor with the oxidizing agent. This second container also communicates through a duct including a control-cock with the supply duct, while the reaction vessel has at least one out-let duct for the supplied gaseous medium including a controllable stop valve by which the pressure in the reaction vessel can be regulated.

Heating systems of the aforesaid kind are known; they have the advantage of being capable of supplying heat independently of the surroundings, and without consuming air and without expulsion of flue gases They are therefore particularly suitable for use at places where an adequate quantity of combustion air is not available and/or at places where pollution of air by flue gases cannot be tolerated. Heating systems of the kind in accordance with the present invention may be employed for supplying heat to devices in which a working medium performs a thermo-dynamic cycle between an expansion space at high temperature and a compression space at lower temperature. Examples of such devices are gas turbines and hot-gas engines. The heating system can supply the heat to the device by establishing a contact between the fluid in the reaction vessel and the heater of the device, which is usually a tubular heat-exchanger traversed by the working medium on its way to the expansion space. If desired, the heat transfer from the reaction vessel to the heater may be performed with the aid of a heat conveying medium, for example, liquid NaK, which circulates in a duct system which exchanges heat on the one hand with the reaction vessel and on the other hand with the heater.

The metal or metal mixture in the reaction vessel may be formed by one or more of the metals Li, Ca, Na, K, Mg, Al and/or one or more of the rare earth metals. These metals and particularly combinations thereof have the advantage of a comparatively low melting temperature and of a great development of heat per unit of volume. The oxidizing agent may be formed by a halogen or a halide, particularly fluorine or a fluorine compound. The oxidizing agent is supplied in dosed quantities to the reaction vessel in which it reacts with the metal or metals while developing heat. Salts are formed which are solid and/or liquid at the operational temperature.

The inert gas of the second container can be conducted by opening the control-valve together with the oxidizing agent to the reaction vessel. The supply of inert gas serves to ensure a rate of flow of the medium in the supply duct opening out in the reaction vessel such that (a) said duct is cooled by the flow of medium to an extent that the oxidizing agent will not react with the material of said duct, and (b) the liquid of the reaction vessel cannot penetrate into the supply duct. For this purpose a constant flow of inert gas can be carried on with the oxidizing agent. It is furthermore possible to have carried along constantly, the desired quantity of inert gas required for cooling and for avoiding penetration of liquid. The inert gas furthermore serves to maintain a constant pressure on the liquid in the reaction vessel, so that it can be caused to circulate by means of a pump and the oxidizing agent can be supplied to the reaction vessel constantly against the same pressure.

In order to maintain a constant pressure in the reaction vessel the inert gas has to be conducted away. For this purpose it is known to provide an outlet for this inert gas in the upper side of the container, where a gas bubble is formed, said outlet having a closing member which permits regulation of the pressure in the vessel.

This construction has the disadvantage that when the liquid in the vessel fluctuates or the position of the vessel changes the liquid may cover the outlet. In order to prevent the liquid from penetrating into the outlet, the closing member has to be shut. For conducting away the inert gas in spite of the above problem, a further outlet free of the liquid has to be opened. For this purpose a control-member and a plurality of required closing members has to be employed which cause this system to be expensive and sensitive to disturbances.

The invention has for its object to provide a heating system of the kind set forth in which the outlet of the supplied inert gas is substantially independent of the position of the reaction vessel and of any fluctuations of the liquid.

For this purpose the heating system in accordance with the invention is characterized in that the reaction vessel accommodates a centrifuge capable of producing at least locally a rotation of the liquid, while the outlet of inert gas opens out in the vicinity of the rotary shaft of the centrifuge.

By centrifuging the liquid with the inert gas a gas bubble is formed around the rotary shaft of the centrifuge, since the gas has a considerably lower weight than the liquid. By having the outlet open out at the place of this gas bubble, the gas can be conducted away. Obviously independent of the position of the vessel the gas bubble is constantly located around the rotary shaft of the centrifuge so that it any position of the vessel the gas can blow away through said outlet.

In connection with the present application the term "centrifuge" has to denote a device comprising a plurality of blade-shaped members arranged around a rotary shaft capable of rotating the liquid around the rotary shaft.

In order to avoid expulsion of liquid at too low a speed of the centrifuge, that is to say at the start and at the stop, when it is no longer certain whether the gas bubble is really formed, a further closing member may be provided at the area of the out-let opening for the inert gas, while a control-member is provided for opening said closing member when the operational speed of the centrifuge is attained.

In a further advantageous embodiment of the heating system in accordance with the invention the inert gas out-let includes a liquid separator and a separator for vaporous metal and/or salt particles between the further closing member and the controllable stop valve. The inert gas conducted away is thus effectively purified so that it may be fed back to the second container, for example, by means of a compressor.

In another embodiment of the heating system in accordance with the invention, in which the reaction vessel is formed by a circular channel and which comprises a pump for circulating the liquid, the supply duct of the oxidizing agent and the inert gas opens out at a place of the circulating channel is located in front of the centrifuge, viewed in the direction of flow of the liquid.

The invention will be described more fully with reference to the drawing.

FIGS. 1 and 2 show schematically and not to scale two embodiments of heating systems.

Referring to FIG. 1, reference numeral 1 designates the cylinder of a hot-gas engine, in which a piston 2 and a displacer 3 are adapted to move. The piston 2 and the displacer 3 are connected by a piston rod 4 and a displacer rod 5 respectively with a driving gear (not shown). A compression space 6 is provided between the piston 2 and the displacer 3 and communicates through a cooler 7, a regenerator 8 and a heater 9 with an expansion space 10. The heater 9 is formed by a crown of pipes 11, communicating at one end with the regenerator 8 and at the other end with an annular channel 12 and by a crown of pipes 13, located between the pipes 11, and connecting the annular channel 12 with the expansion space 10.

The heater 9 is arranged in a reaction vessel 15 containing a liquid mixture of mainly Li and Ca. The vessel 15 accommodates a pump 16 which is coupled through a shaft 17 with an electric motor 18. The pump 16 causes the liquid in the vessel 15 to circulate and a guiding partition 19 conducts the flow of liquid in the direction of the arrow towards the heater 9, from which the liquid flows back to the suction side of the pump.

A reservoir 21 contains an oxidizing agent, preferably $SF_6$, and communicates through a duct 22 including a control-valve 23, with a plurality of supply ducts 24, only two of which are shown for the sake of clarity.

There is furthermore provided a reservoir 25 containing an inert gas, for example, argon. The reservoir 25 communicates through a duct 26 including a control-cock 27 also with the supply ducts 24.

When the stops 23 and 27 are opened, the oxidizing agent and the inert gas flow into the vessel 15. The oxidizing agent reacts immediately with the metal contained therein so that solid and/or liquid salts are formed while heat is developed. The developed heat is given off to the working medium of the hot-gas motor which traverses the heater 9. The inert gas is not affected and if no outlet were provided for this medium, a rise in pressure would be produced in the vessel 15. A centrifuge 30, formed by a plurality of blades connected with the rotor of the pump 16, rotates the mixture of liquid and inert gas. Owing to the difference in specific weight a gas bubble is formed around the shaft 17 at 31. The shaft 17 has a channel 32, which opens out at 31 and at the other end in a space 33. The space 33 accommodates a plurality of plates 34, against which collides the inert gas conducted away so that any liquid particles carried along by said medium are separated out. The separated liquid is left in the space 33. The space 33 communicates with a vapor separator 35, which is cooled so that the inert gas is cooled and any vaporous metal or salt particles which may be carried along will condense and be collected. The vapor separator 35 communicates through a duct 36 including a control-cock 37 with the suction side of a compressor 38, which compresses the inert gas and feeds it back into the reservoir 25.

The channel 32 in the shaft 17 can be closed by a lap 40, the stem of which is formed by the shaft 17 and which co-operates with an electro-magnet 41. The electro-magnet is controlled by a centrifugal switch 42 so that, when a given operational speed is attained, the magnet 41 is energized and the flap 40 is opened.

The heating system operates as follows. In the first place the metal mixture in the vessel 15 is melted, for example, by means of an electric heating device (not shown). Then the control-cocks 23 and 27 are opened so that oxidizing agent and inert gas flow into the vessel 15. The electric motor 18 is energized so that the pump 16 and the centrifuge 30 become operative. When the operational speed is attained, the centrifugal switch 42 causes the electro-magnet 41 to be energized so that the flap 40 is opened. In this way liquid is prevented from flowing out of the vessel 15 into the space 33 when the flap is opened prematurely, that is to say at too low a speed of the centrifuge 30, when no gas bubble has yet been formed. By means of the control-cock 37, a given desired pressure is maintained in the space 33 so that, when the pressure in the vessel 15 increases slightly, inert gas flows through the channel 32 into the space 33 and from there through the vapor separator 35 and the compressor 38 back into the reservoir 25.

In this way an outlet of inert gas is obtained, which is substantially independent of the position of the heating system. Thus a constant pressure is ensured in a fairly simple manner. Owing to this constant pressure cavitation phenomena and the associated noise in the pump and in the reaction zone are completely suppressed, while the supply of oxidizing agent can always be performed against the same pressure.

Although in the device shown in FIG. 1 the pump and the centrifuge are combined, it will be obvious that separate structures thereof are also possible under given conditions.

FIG. 2 shows a modified embodiment of the device of FIG. 1 schematically and not to scale. The reaction vessel 15 communicates through an outlet duct 50 and a supply duct 51 with a outer vessel 52 containing the same metal mixture as the reaction vessel 15. Since the outlet duct 50 communicates with the compression side of the pump 16, and the supply duct 51 with the suction side of the pump, a flow of liquid will constantly pass through the outlet duct 50 to the spare vessel 52, and through the supply duct 51 a flow of liquid will constantly pass to the reaction vessel 15. Resultant salts will be carried along by the flow through the outlet duct 50 out of the reaction vessel 15, which salts settle down in the spare vessel 52 due to their higher specific weight. The flow through the supply duct 51 will have a poor salt content so that in the reaction vessel 15 a low, constant concentration of salts will be found which is a guarantee for satisfactory reaction conditions.

Otherwise the device is constructed and operates like that shown in FIG. 1 so that a detailed description thereof may be dispensed with.

What is claimed is:

1. A heating system for producing heat by the exothermic reaction of an oxidizing agent and re-actant material comprising:
   a. a reaction vessel for containing a quantity of said reactant material which is liquid at the operational temperature of the system,
   b. a first reservoir for containing a quantity of said oxidizing agent,
   c. first supply duct means for conveying the oxidizing agent from the first reservoir to the vessel,
   d. means for regulating the flow in the first supply duct means,
   e. a second reservoir for containing a quantity of gas inert to the reactant material and to the oxidizing agent,
   f. second supply duct means for conveying the inert gas from the second reservoir to the first supply duct,
   g. inert gas discharge means for discharging inert gas from the vessel and for controlling said discharge, including a centrifuge with a shaft one part thereof being rotatable in the liquid within said vessel, gas-collection means in the vicinity of said shaft, and out-let duct means communicating gas from the collection means out of the vessel, whereby liquid is driven by the centrifuge outward from the shaft and the inert gas is driven inward to the gas-collection means and discharged via the out-let means.

2. Apparatus according to claim 1 wherein said reactant material is at least one of the group comprising Li, Ca, Na, K, Mg, Al, and rare earth metals, and the oxidizing agent is a halogen or halide such as sulfur hexafluoride ($SF_6$).

3. Apparatus according to claim 2, further comprising means driven by the centrifuge for opening said gas-discharge means and permitting same to remain open for operation only after the centrifuge shaft has reached a predetermined minimum speed of rotation.

4. Apparatus according to claim 2 further comprising means for separating liquid from the inert gas being discharged.

5. Apparatus according to claim 1 wherein said inert-gas discharge means includes a discharge chamber, and wherein said shaft has a hollow portion with axially spaced apertures one of which communicates with the liquid in said vessel and the other communicates with said chamber, whereby gas collected by the gas-collection means flows into the chamber before discharge via said out-let duct.

6. Apparatus according to claim 5 further comprising means formed as transversely extending plates in said gas-discharge chamber against which discharge gas collides for separating liquid particles carried by the gas from being discharged therewith.

7. Apparatus according to claim 3 further comprising means between the gas-discharge means and the second reservoir, for condensing and then separating from the discharged gas unwanted materials such as vaporous metal and salt particles.

8. Apparatus according to claim 1 wherein the reaction vessel in operational orientation has upper and lower parts, the apparatus further comprising an outer vessel surrounding the reaction vessel and containing the same reactant material as the reaction vessel, and having a lower part situated below that of the reaction vessel, and a feeder duct and an exhaust duct through which said material is flowable respectively from the outer vessel to the reaction vessel and conversely, whereby reaction products formed in the reaction vessel, are flowed via the exhaust duct into the outer vessel where they descend to the lower part thereof, and other liquid reactant material in the outer vessel absent reaction products flows via the feeder duct into the reaction vessel.

* * * * *